US012554590B2

(12) United States Patent
Duggal et al.

(10) Patent No.: US 12,554,590 B2
(45) Date of Patent: Feb. 17, 2026

(54) DEDUPLICATING FILES ACROSS MULTIPLE STORAGE TIERS IN A CLUSTERED FILE SYSTEM NETWORK

(71) Applicant: Dell Products L.P., Round Rock, TX (US)

(72) Inventors: Abhinav Duggal, Fremont, CA (US); Philip Shilane, Newtown, PA (US); George Mathew, Belmont, CA (US); Chegu Vinod, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 18/304,359

(22) Filed: Apr. 21, 2023

(65) Prior Publication Data

US 2024/0354201 A1    Oct. 24, 2024

(51) Int. Cl.
*G06F 11/14* (2006.01)
*G06F 11/1446* (2026.01)
*G06F 16/174* (2019.01)

(52) U.S. Cl.
CPC ...... *G06F 11/1453* (2013.01); *G06F 11/1464* (2013.01); *G06F 16/1748* (2019.01); *G06F 2201/84* (2013.01)

(58) Field of Classification Search
None
See application file for complete search history.

(56) References Cited

U.S. PATENT DOCUMENTS

| 9,047,302 B1* | 6/2015 | Bandopadhyay ... G06F 16/1748 |
| 10,990,518 B1* | 4/2021 | Wallace .................. G06F 16/13 |
| 2012/0095968 A1* | 4/2012 | Gold .................. G06F 11/1464 707/652 |
| 2012/0117029 A1* | 5/2012 | Gold .................. G06F 11/1458 707/651 |
| 2015/0006835 A1* | 1/2015 | Oberhofer ............. G06F 9/5016 711/162 |
| 2016/0231928 A1* | 8/2016 | Lewis ................... G06F 3/0638 |
| 2016/0246528 A1* | 8/2016 | Colgrove ............ G06F 12/0246 |
| 2017/0344491 A1* | 11/2017 | Pandurangan ...... G06F 12/1009 |
| 2018/0129426 A1* | 5/2018 | Aron ..................... G06F 3/0611 |

(Continued)

FOREIGN PATENT DOCUMENTS

WO    WO-2021015636 A1 *    1/2021    ........... G06F 3/0652

OTHER PUBLICATIONS

NPL-Cao: Cao et. al., "TDDFS: A Tier-Aware Data Deduplication-Based File System", ACM Transactions on Storage, vol. 15, No. 1, Article 4., Feb. 2019. (Year: 2019).*

*Primary Examiner* — Aleksandr Kerzhner
*Assistant Examiner* — Anugeetha Kunjithapatham
(74) *Attorney, Agent, or Firm* — Staniford Tomita LLP

(57) ABSTRACT

Embodiments are described for a system and method facilitating deduplication in a multi-tier storage system in which a file can have different portions written to different tiers. A process partition the data space of each tier to a number of similarity groups and distributes the similarity groups across file system services in a cluster. The distribution is done in such a way that for a given similarity group ID, the same file system service owns the similarity groups of every tier. This allows for efficient checks for deduplication as it can be done local to a node rather than requiring remote procedure calls.

9 Claims, 7 Drawing Sheets

(56) References Cited

U.S. PATENT DOCUMENTS

| | | | |
|---|---|---|---|
| 2019/0042146 A1* | 2/2019 | Wysoczanski | G06F 12/0846 |
| 2020/0125273 A1* | 4/2020 | Aron | G06F 3/0611 |
| 2020/0336387 A1* | 10/2020 | Suzuki | H04L 41/147 |
| 2022/0092022 A1* | 3/2022 | Agarwal | G06F 16/113 |
| 2023/0176743 A1* | 6/2023 | Dalmatov | G06F 3/0679 |
| | | | 711/102 |

* cited by examiner

402

| Storage Tier | Tier ID |
|---|---|
| Tier A | 1 |
| Tier B | 2 |
| Tier C | 7 |
| Tier D | 3 |
| Tier E | 19 |
| Tier F | 21 |
| Tier G | 22 |

Tier ID Mapping Table

502

| Backup SLA | Tier list |
|---|---|
| SLA1 | 1,2 |
| SLA2 | 7 |
| SLA3 | <null> |
| SLA4 | 3 |

Backup_SLA Mapping for Domain A

DEDUPLICATING FILES ACROSS MULTIPLE STORAGE TIERS IN A CLUSTERED FILE SYSTEM NETWORK

TECHNICAL FIELD

Embodiments are generally directed to distributed networks, and specifically to deduplicating files across multiple storage tiers in a clustered network.

BACKGROUND

A distributed file system is a type of file system in which data is spread across multiple storage devices as may be provided in a cluster of nodes. Clustered network systems represent a scale-out solution to single node systems by providing networked computers that work together so that they essentially form a single system. Each computer forms a node in the system and runs its own instance of an operating system. The cluster itself has each node set to perform the same task that is controlled and scheduled by software. In this type of network, the file system is shared by being simultaneously mounted on multiple servers. The distributed file system can present a global namespace to clients (nodes) in a cluster accessing the data so that files appear to be in the same central location. Distributed file systems are typically very large and may contain many hundreds of thousands or even many millions of files, as well as services (applications) that use and produce data.

The Santorini file system is a type of clustered system that stores the file system metadata on a distributed key value store and the file data on object store. The file/namespace metadata can be accessed by any front end node, and any file can be opened for read/write by any front end node.

In a data protection system, data is typically backed up by copying the data from a data source to a data target or storage device or network. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. This greatly reduces storage requirements in the system.

In a clustered network, each domain can provide different classes of storage, in different storage 'tiers,' with device types to provide different cost and performance characteristics, such as hard disk versus solid-state disk drives. When the storage target comprises such multiple storage tiers, deduplication processes must be tailored to efficiently deduplicate data in these storage tiers. One characteristic of a multi-tier system is that a file could have a portion written to one tier and another portion written to a different tier due to deduplication considerations.

What is needed therefore, is a way of implementing a deduplicating file system across multiple storage tiers so that file data can be efficiently deduplicated across the tiers.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
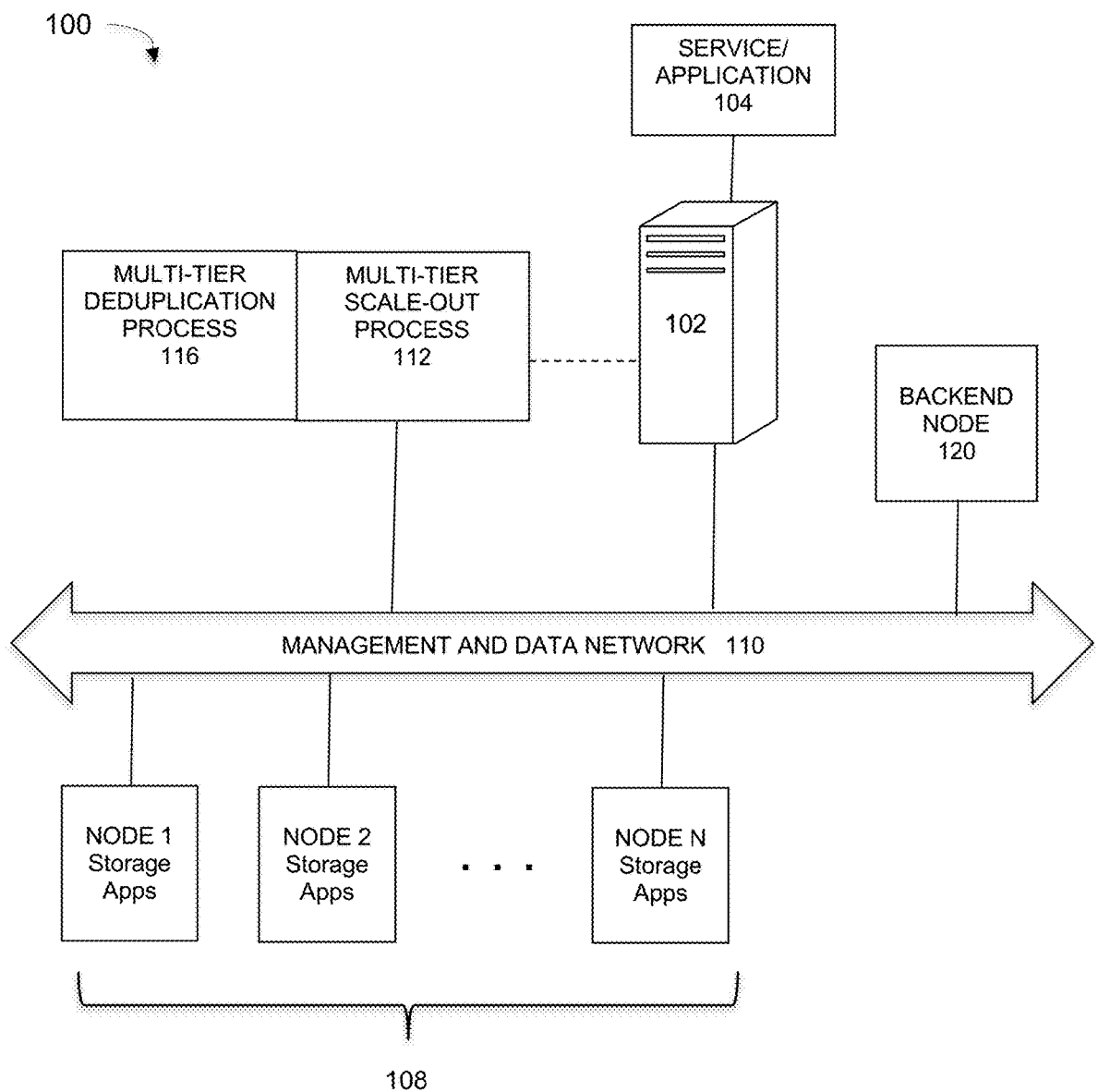
FIG. 1 is a block diagram of illustrating a distributed system implementing a multi-tier storage system, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a multi-domain and multi-tier architecture for clustered network file systems (e.g., Santorini). This architecture facilitates the creation and use of sub-clusters, called domains, where the resources in a domain are allocated only from the nodes in the domain, and each domain can have different storage tiers offering different classes of storage devices to balance cost and performance characteristics.

FIG. 1 is a block diagram of illustrating a distributed system implementing a multi-tier system and architecture, under some embodiments. System 100 comprises a large-scale network that includes a number of different devices, such as server or client computers 102, nodes 108, external or internal storage devices, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system (also referred to as a cluster or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and computer 102 through network 110. Theses client compute nodes may include installed agents or other resources to process the data of application 104. The application at the server 102 communicates with the nodes via the control path of network 110 and coordinates with certain agent processes at each of the nodes 108 to perform application functions of the distributed file system.

As shown in FIG. 1, the network comprises a set of nodes (1, 2, . . . . N) that constitute a Santorini cluster, and each node has some amount of storage and processor resources to run applications. That is, every node has some resident memory (e.g., HDD, SSD, RAM, etc.) and runs processes that perform backup storage tasks or other tasks. In an integrated data protection system, the backup software application runs on the several clustered nodes. Other network configurations are also possible, however, such as cloud deployments in which the application software runs in VMs with attached SSDs, in which case the object storage would be separate from the VMs, and other configurations as well.

The network 110 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform.

For the example network environment 100 of FIG. 1, server 102 is an application server that executes one or more applications or processes 104 that processes data in the system using one or more nodes 108. One typical application is a data backup management application that coordinates or manages the backup of data from one or more data sources, such as other servers/clients to storage devices, such as network storage and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as internal node storage or even external storage, which may at least be partially implemented through storage device arrays, such as RAID (redundant array of independent disks) components.

In an embodiment network 100 may be implemented to provide support for various storage architectures such as storage area network (SAN), Network-attached Storage (NAS), or Direct-attached Storage (DAS) that make use of large-scale network accessible storage devices, such as large capacity disk (optical or magnetic) arrays for use by a backup server, such as a server that may be running Networker or Avamar data protection software backing up to Data Domain (DD) protection storage, such as provided by Dell/EMC™ Corporation.

As shown in FIG. 1, system 100 includes a process 112 that is executed by the system to manage the multi-tier (and even multi-domain) scale-out of the system. In general, process 112 and any associated processes (e.g., 116) are application programs that are executed within each node of the system. Alternatively, as shown in FIG. 1, process 112 may be a process executed by a specialized node as a specially configured management or control node in system 100. Alternatively, it may be executed as a server process, such as by server 102 or any other server or client computer in the system. The scale-out process 112 works with the other components of the distributed system and may use certain services or agents that run on each compute node 108 in the distributed system, such as may be implemented as a daemon process running in each node. As understood, a daemon is a computer program that runs as a background process, rather than being under the direct control of an interactive user.

Within the system 100, there are typically different classes of storage, called tiers, with different cost and performance characteristics. Files can be placed on a set of tiers depending on a storage level agreement (SLA) specified for a file. Tier examples include a higher performance tier consisting of solid-state disk (SSDs) and a lower performance tier of hard disk drives (HDDs), or other similar storage device types. For the embodiment of FIG. 1, a multi-tier deduplication process 116 works with a backup system (e.g., backup server 102 running a backup program as the application 104) to optimize deduplication operations across these multiple storage tiers.

In an embodiment, the multi-tier process 112 is used in a clustered network that implements Kubernetes clusters. One such example network is the Santorini system or architecture, though other similar systems are also possible. For this embodiment, system 100 uses Kubernetes as an orchestration framework for clustering the nodes 1 to N in FIG. 1.

Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel.

As stated above, the clustered network 100 of FIG. 1 may provide different classes of storage, in different storage 'tiers,' with device types to provide different cost and performance characteristics, such as hard disk versus solid-state disk drives. When the storage target comprises such multiple storage tiers, deduplication processes must be tailored to efficiently deduplicate data in these storage tiers. Embodiments include a multiple storage tier deduplication manager or process 116 that optimally distributes resources across a distributed deduplicating file system so that a file can be stored across multiple storage tiers such that the global deduplication can be maximized, and that minimizes overhead of deduplication across multiple storage tiers.

As an overview, embodiments partition the data space of each tier to 'n' similarity groups and distributes the similarity groups across file system services in a cluster. The distribution is done in such a way that for a given similarity group ID 'x', the same file system service owns the similarity groups of every tier. This allows for efficient checks for deduplication as it can be done local to a node. With respect to the term 'owns,' a given node may have a service assigned to similarity groups 1-512, for example. That node then has portions of the fingerprint index associated with similarity groups 1-512 stored in the memory within that node so they are faster to access than communicating with other nodes when performing a fingerprint lookup. The fingerprint index may be replicated on other nodes and may also have a version stored in object storage that are slower to access and are only used when a node fails during a recovery process.

Figure 2:
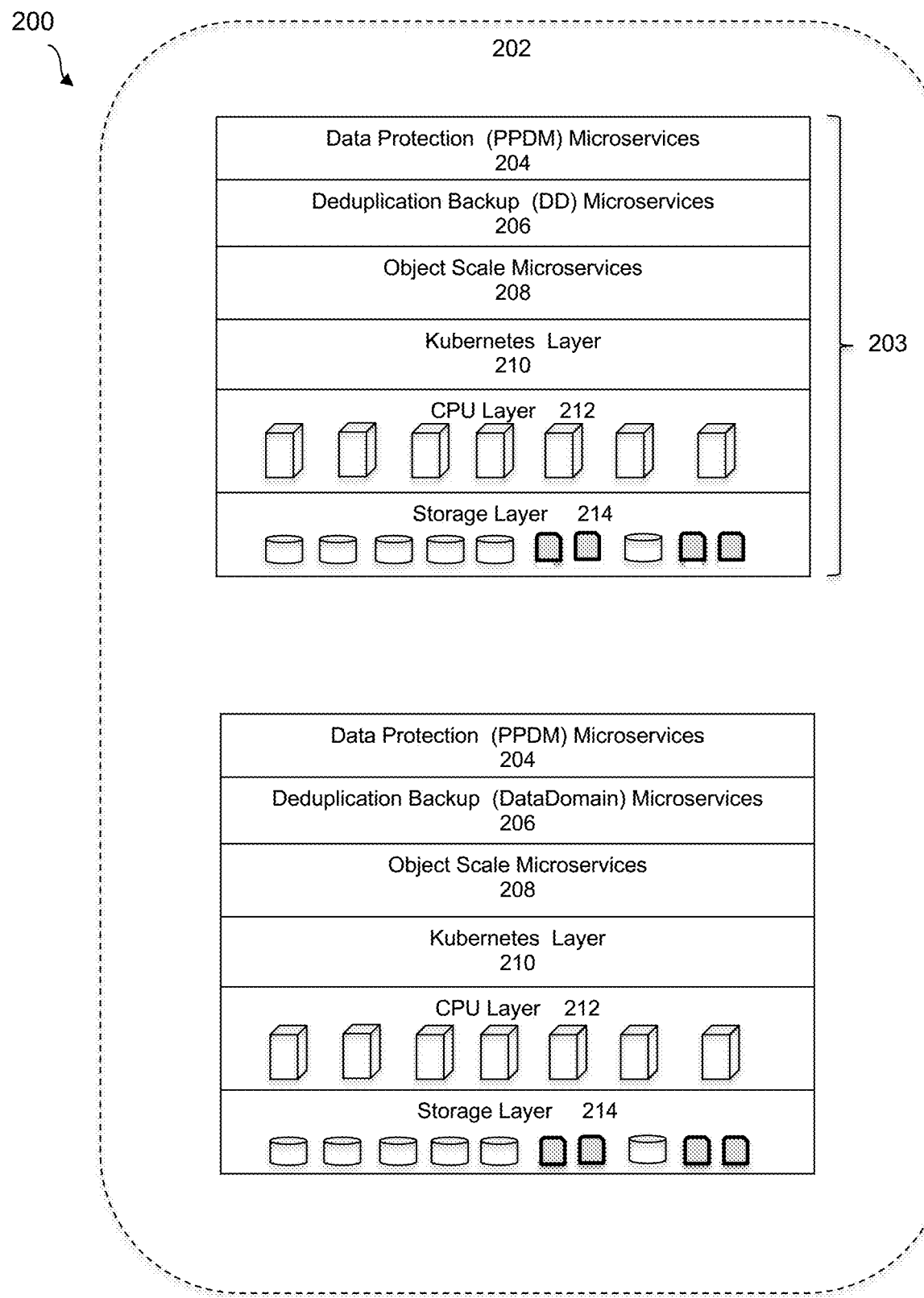
FIG. 2 illustrates a high-level overview of a network cluster using the Santorini architecture, under some embodiments.

FIG. 2 illustrates a high-level overview of a network cluster using the Santorini architecture, under some embodiments. In system 200 of FIG. 2, a two-node cluster 202 is shown, though any number of nodes may be used. Each node 203 consists of several distinct components or processing layers. For the example shown, a node includes a Power-Protect Data Manager (PPDM), or similar microservices layer 203, a deduplication backup appliance microservices layer 206 (e.g., for Dell Data Domain or DD), an object scale microservices layer 208, a Kubernetes layer 210, a processor layer 212, and a storage layer 214 including different types of storage media, such as HDD, Flash memory, SSD memory, and so on. Each of these component products consists of multiple microservices, and as more nodes are added, Santorini scales CPU, storage, RAM, and networking accordingly. Other layers can also be included, and a cluster 202 may comprise any practical number of nodes 203.

As shown in FIG. 2, embodiments of the cluster network 200 through DD microservices 206 utilize DD backup appliances to provide streaming deduplication, and which use the DD File System (DDFS) as an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using the SHA1 algorithm. DDFS has an on-disk fingerprint index table, which maps the fingerprint to the container-ID, that has the corresponding segment data. The container has a metadata section followed by several data sections. The data sections store the compression regions, and the container has its metadata stored in the metadata section. In addition, the system stores c-metadata (container metadata) that has the metadata section of multiple containers. Thus, the system stores the total number of compression regions, the total number of segments, the fingerprint of each segment, and so on.

In a deduplicated filesystem that forms segments from data, these segments are uniquely identified by their key/label called a 'fingerprint.' Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

A Data Domain or similar system can efficiently copy an existing file using the same underlying Merkle tree. It creates the new file with a new name, and therefore a new L6 root of the tree, but that tree then references the identical LP chunks. As this operation involves only the root of the tree, it is trivially fast and does not increase physical space in use beyond the one chunk containing the L6.

In an embodiment, the PPDM (PowerProtect Data Manager) microservices layer 204 builds on the Data Domain system 206 to provide data protection capabilities for VM image backups and Kubernetes workloads.

Figure 3:
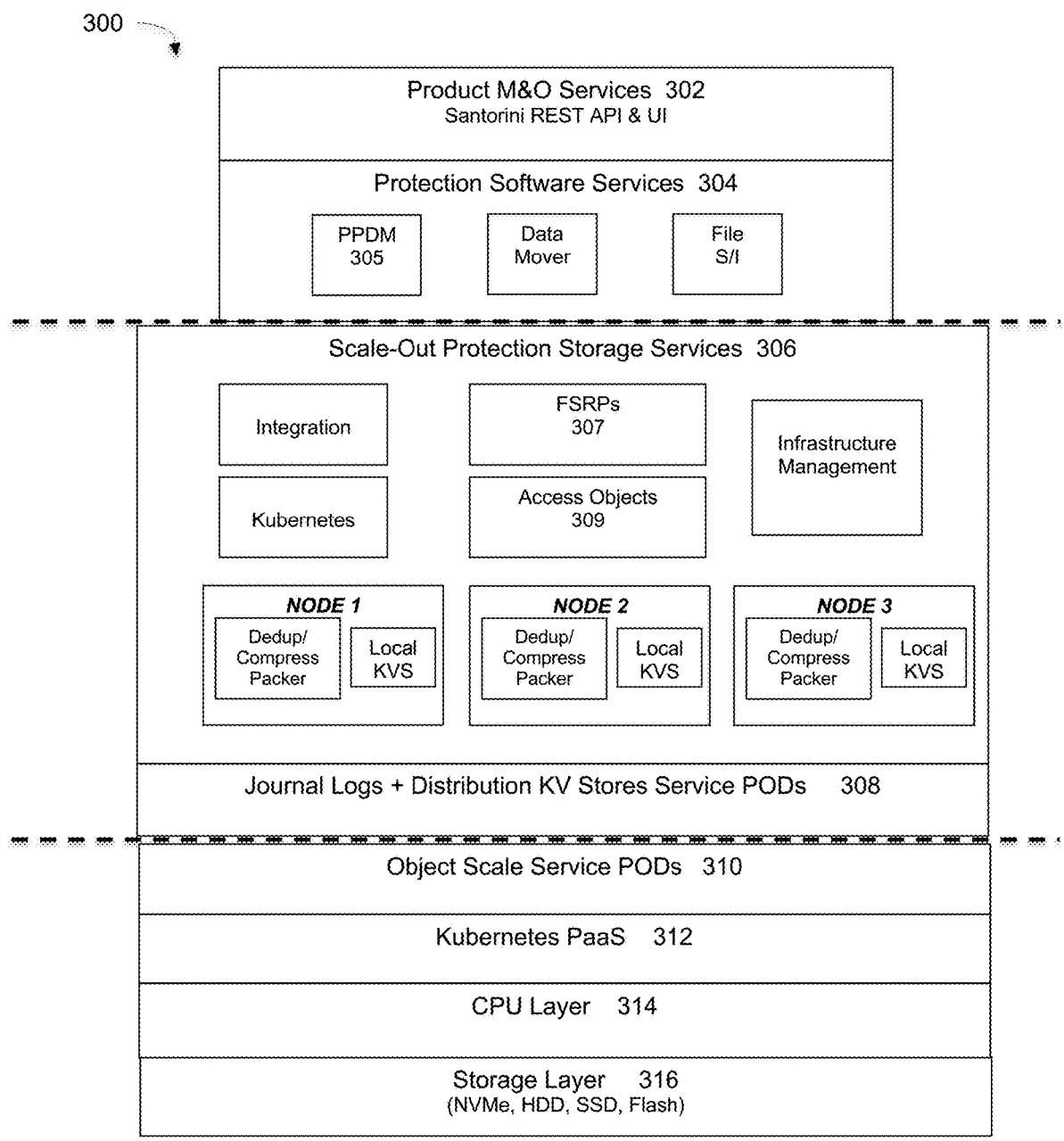
FIG. 3 illustrates details of the services related to the data path running in a Santorini cluster network, under some embodiments.

FIG. 3 illustrates details of the services related to the data path running in Santorini cluster network, under some embodiments. As shown in diagram 300, a product services layer 302 provides the necessary REST APIs and user interface utilities. The API server implements a RESTful interface, allowing many different tools and libraries can readily communicate with it. A client called kubecfg is packaged along with the server-side tools and can be used from a local computer to interact with the Kubernetes cluster.

Below layer 302, the protection software services layer 304 includes a data manager (e.g., PPDM) component 305 that provides backup software functionality. Within the scale-out protection storage services layer 306, the File System Redirection Proxy (FSRP) service 307 redirects file operations in a consistent manner based on the hash of a file handle, path, or other properties to instance of the access object service 309. The access object service 309 handles protocols and a content store manager. This means that files are segmented and the Lp tree is constructed by an access object 309. The FSRP 307 redirects file system accesses in a consistent way to the access objects 309 so that any in-memory state can be reused if a file is accessed repeatedly in a short time, and it avoids taking global locks.

Also included in this layer 306 are any number of nodes (e.g., Nodes 1 to 3, as shown), each containing a dedup/compression packer and a key-value (KV) store. Depending on system configuration, many of the other components in FIG. 3, including PPDM 305 and Object Scale PODS 310, among others, can also be in these nodes.

In a Santorini file system, similarity groups are formed by mapping certain sets of data to similarity groups. This mapping function could be based on a hash of some of the data spanned by the data. For example, it could be a selected fingerprint from the hundreds of L0 fingerprints in the L1, or it could be some of the bytes from the selected fingerprint. That selected value itself could be in a very large range, so the system maps it down to the range of similarity groups with a simple mod operator or other function.

As a set of L1 segments (referred to simply as an "L1") is formed, a similarity group is calculated for the L1 based on the SHA1 fingerprints of the L0 segments (or other properties). The similarity group is checked against a mapping table, which leads to consistently routing the L1 based on its similarity group to an instance of a node's deduplication/compression service. If similarity groups are in a range of 0-1023, then if there are four instances of the dedup/compress service, the instances may uniquely be responsible for the ranges 0-255, 256-511, 512-767, 768-1023, though other mappings are possible. The dedup/compress instance will deduplicate the L0 segments relative to other fingerprints within the same similarity group. Other functionality exists in the dedup/compress service such as packing segments into compression regions, containers, and blobs that will be written to an underlying object storage such as provided by the Object Scale service layer 301, or an object store provided by the public cloud.

Distributed key value stores are also a component of Santorini and are used to hold much of the metadata such as the namespace Btree, the Lp tree, fingerprint index, and container fingerprints. These run as containers within the Santorini cluster and are stored to low latency media such as NVMe. There is also a distributed and durable log that replaces NVRAM for Santorini.

As shown in FIG. 2, the storage layers 214 of each node can include different types of storage media. These media devices provide different levels of performance and capacity based on cost and availability. For example, HDD storage is typically large and cheap, but relatively slow, while SSD storage is fast but expensive and limited in capacity. Certain users may wish to accelerate write/reads of certain workloads or alternatively lower the cost of storage with the tradeoff of increased latency and lower throughput. Embodiments of system 200 provide different tiers of storage, allowing a user to select where to place their data based on their business requirements, where each tier represents a different type or class of storage media based on these characteristics.

Each storage tier can meet certain SLA or service level objectives (SLO) such as latency, throughput, and cost. While a variety of storage tiers are possible, in most systems, the likely storage tiers are Flash, HDD, and a remote object store that likely uses HDDs. It is also possible to adjust the RAID configuration to control resilience to failures, which leads to different storage space overheads. For example, a domain can have storage tier1 which is allocated from a set of high performance NVME devices, storage tier 2 that is allocated from RAID 6 with 10 data columns and 4 parity columns, storage tier 3 that is a RAID 6 volume with 10 data columns and 2 parity columns, and storage tier 4 that is configured from external cloud storage. This is mentioned for purposes of example only, and other systems may have different storage device configurations.

Each storage tier is associated with a backup service level agreement (Backup_SLA) or SLO. Files can have an SLA attribute that shows in which storage tier the file data should be kept. The storage tier is mapped to a backup SLA when the storage tier is created in a domain. As in the previous example, storage tier 1 is associated with Backup_SLA "performance," storage tier 2 is associated with "high availability," and storage tier 3 is associated with "regular backup SLAs." A tier can be present in only one backup SLA, but a backup SLA can have multiple tiers. For example, perfomance_SLA can have a SSD_Tier and a NVME_Tier.

Each file can have a lifecycle where it is migrated from one tier to another as it ages based on the SLA associated with that file or the backup set itself. This is managed from the backup software, such as PPDM. A file may start on a performance tier in case a recent backup needs to be accessed or restored. As time passes and more backups are created, it is less likely to be needed again, so a policy may migrate it to a regular backup tier for longer term preservation at lower media cost.

In an embodiment, the Santorini system supports multiple storage tiers in the same backup SLA. This would be needed as multiple storage tiers might be created because of device characteristics (NVME, SSD, HDD, etc.), different availability characteristics (10+2 RAID, 10+4 RAID, etc.) or because of enclosure boundaries (storage from external ECS1 or external ECS2, etc.) and the number of storage tiers could be more than the number of backup SLAs consumed by the backup application. On an integrated product that has both backup software and storage, the system could restrict the number of storage tiers supported to be the same as the number of backup SLAs as it has tighter control on both the backup application and the storage subsystem.

The system also supports having a backup_SLA with multiple tiers (where a tier can be only in one backup SLA), and having the ability for a file to span the storage tiers and support deduplication across storage tiers. An initial implementation of the integrated solution can be simplified by having only one storage tier in a backup SLA.

Each domain has a default tier, if a domain does not have backup SLA mapping to a tier, the file will be placed in the default tier. Similarly, if the file does not have a backup SLA, the file will be placed in the default tier.

Figures 4, 5, 6:
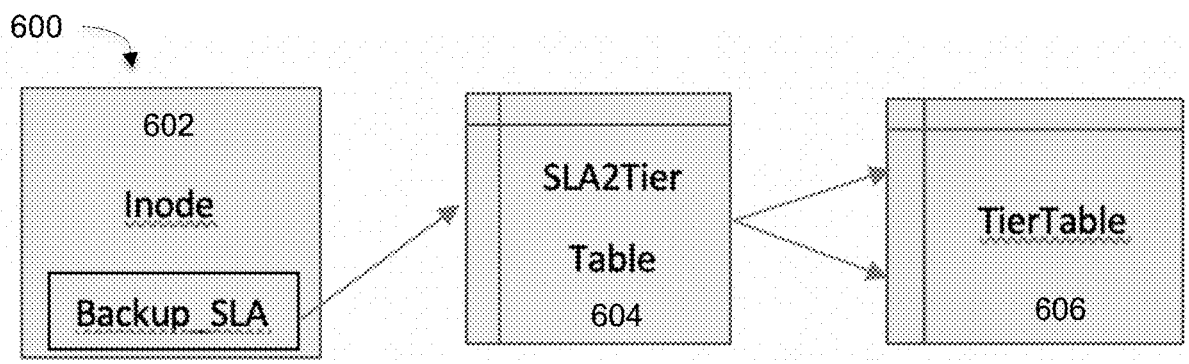
FIG. 4 is a table that illustrates an example tier ID to storage tier mapping table per domain, under an example embodiment.
FIG. 5 is a table that illustrates an example backup service level agreement (SLA) to tier ID mapping table, under an example embodiment.
FIG. 6 illustrates how storage tiers are identified for file placement in a Santorini system, under some embodiments.

Each storage tier in the file system is assigned an integer value 'tier_ID.' These values are global in the Santorini cluster, across all domains. FIG. 4 is a table that illustrates an example tier ID to storage tier mapping table per domain, under an example embodiment. The example table 402 illustrates the possible tier IDs mapped to storage tiers A to G.

The backup SLA definitions are across domains. For each domain, a Backup_SLA to tier_ID mapping table is kept that gives the tier_ID list for the backup SLA for that domain. This gives us a system-wide mapping table of storage tier to tier id and a per domain mapping of a Backup_SLA to a tier IDs. Table 502 of FIG. 5 illustrates an example Backup_SLA to tier_ID mapping table, under an example embodiment. For this example, storage tiers 1 and 2 provide SLA1 level storage, storage tier 7 provides SLA2 level storage, no tier provides SLA3 storage, and storage tier 3 provides SLA4 storage. The SLA terms for each SLA level (SLA1, 2, 3, etc.) are defined by the backup system and dictate a performance/cost/capacity characteristic of the storage system, such as SLA1=fast/expensive, SLA2=slow/cheap, SLA3=high availability, SLA4=cloud storage, and so on.

Files can be created with a backup SLA attribute. Depending on the backup SLA attribute of a file, the data and metadata of the file will be kept in the associated storage tiers. The backup SLA can be specified at the time of create or can be an inherited attribute from an upper level directory. In general, a backup SLA is defined by a PPDM for a client. This can be transformed to setting a per file attribute using the Backup_SLA to tier_list mapping of FIG. 5. The file system attribute is set as the tier list pointed to by backup SLA.

The Data Domain file system supports inheritable attributes where an attribute can be set on a parent directory and new files and subdirectories created in it will inherit the attribute. This would work well for the case where a backup SLA is associated with a client that has an associated directory. A Backup_SLA attribute can be set on the client's directory and every file or directory created in it will inherit the Backup_SLA attribute. The files Backup_SLA attribute is also stored in the file inode in file manager (FM). Looking at the Backup_SLA mapping table in the domain, the list of tiers where the file data can be placed could be generated.

Depending on the Backup_SLA attribute of a file, the data and metadata of the file will be kept in the associated storage tiers. The backup SLA can be specified at the time of creation or can be an inherited attribute from an upper-level directory. As stated above, DDFS supports inheritable attributes where an attribute can be set on a parent directory and new files and subdirectories created in it will inherit the attribute. The file's Backup_SLA attribute is also stored in the file inode in the file system. Looking at the backup_SLA mapping table 502, the list of tiers where the file data can be placed can be generated.

FIG. 6 illustrates how storage tiers are identified for file placement in a Santorini system, under some embodiments. As shown in diagram 600 of FIG. 6, a Backup_SLA in a file or inode 602 points to a tier_ID list in the SLA_to_Tier mapping table 604 (which may be exemplified by table 502 in FIG. 5), and will identify multiple storage tiers through the tier table 606 (which may be exemplified by table 402 in FIG. 4). Given a file's SLA, the location of its contents will be stored to one or more tiers associated with that SLA as specified in SLA2Tier 604. The actual tier IDs are determined by TierTable 606. As a file progresses through its lifecycle, a process can update the Backup_SLA for a file and update the location of its data to reside within the appropriate tier or tiers.

In an embodiment, this amount of data for a similarity group comprises the data in an Mtree L1 layer. An L1 layer consists of hundreds of L0 fingerprints, and each L0 is about 8 KB, so an L1 spans about 4 MB of data. Other amounts of data are also possible to define similarity groups, but for this example every L1 is mapped to a similarity group.

In general, there can be 1024 (and likely not more) similarity groups per tier, though other numbers are also possible. This amount of L1 segment file data (e.g., 'an L1's worth') is examined by the access object 309 service to generate a similarity group ID, and the tier_ID list for that file and the similarity group ID is used to decide where the data needs to be sent for backend processing where deduplication takes place. The assignment of an L1 to a backend is based on both properties of the L1, the similarity group ID (simgroupID) and the SLA, which corresponds to a tier list that meets the backup SLA, such as shown in Table 502.

In an embodiment, therefore, an L1 worth of data is mapped to a similarity group, and there are 1024 similarity groups per tier (for example). These 1024 similarity groups are distributed among the backend deduplication/compression services in such a way that the same dedup/compress node owns the similarity group id 'n' for all tiers. The Access Object service examines a L1 worth of file data to generate a similarity group ID. The L1 worth of data is transferred to the dedup/compress node that own the similarity group along with the tier_ID list. The segment level deduplication happens in the dedup/compress service.

If the entire segments in the L1 exists in any of the tiers in the tier list, the data is not written and a new L1 is created to point to the tier that has the data. The similarity group ID, as well as the tier_ID is stored in the corresponding L2 that points to the L1 entry.

If, however, the entire L1 does not exist in any of the tiers listed in the tier_ID list, one of the tiers in the tier_ID list is chosen to store the data, to either optimize for deduplication or to optimize for free space, and a new L1 is created to point to the tier where the L1 was written. For a given similarity group, since a single dedup/compress service owns all the similarity group for all tiers, checking for deduplication across tiers becomes a local operation without any remote procedure calls (RPCs), and can be done in parallel as L1s are processed independently.

In an embodiment, the dedup/compress service considers the number of segments that are duplicates for each of the possible tiers in the tier list. As an example, 400/512 L0s may be duplicates in tier 1 while 215/512 L0s may be duplicates of tier 2. Higher deduplication (and greater space savings) will be achieved by assigning the L1 to tier 1 in this example. The non-duplicate segments would then be compressed into compression regions, packed into containers and blobs, and written to tier 1. As a further consideration, after calculating how many L0s would be written to tier 1 and tier 2, the amount of remaining capacity in tier 1 and tier 2 can be determined. In this example, tier 1 may have 5% of its capacity remaining while tier 2 may have 75% of its capacity remaining. In order to balance the usage of the tiers, it may be determined to write the L1 to tier 2 in this case.

An L1 will only be mapped to a single tier, but different L1s from a file may have different tier assignments based on optimizing deduplication, balanced space usage, or other properties. With this optimization, once the access object service generates a similarity group ID, it just needs to pass the data and the tier_ID list to the backend node that owns the similarity group. If there are multiple tiers in the tier_ID list, the deduplication processing across these tiers will be local to the node.

Each tier has an associated key-value (KV) store storage. The key-value store for a tier can be configured when a tier is added. This allows the storage for KVS to be allocated from an appropriate storage device. Thus, for example, the KVS for a NVME can be placed in PMEM, or a KVS for a cloud storage can be placed in HDD, and so on.

For each similarity group in a tier, KVS can be optimized to move the RAFT (or similar) leader to the node that owns the similarity group which will further reduce the number of RPCs needed for a read, where RAFT is a protocol to handle multi-node communication and avoid data inconsistency. While the KVS is associated with a local storage tier, copies are made to followers on other nodes to protect against the loss of a node. Placing a RAFT leader at the node that owns the similarity group reduces RPCs since fewer RPCs go to followers than the leader.

Figure 7:
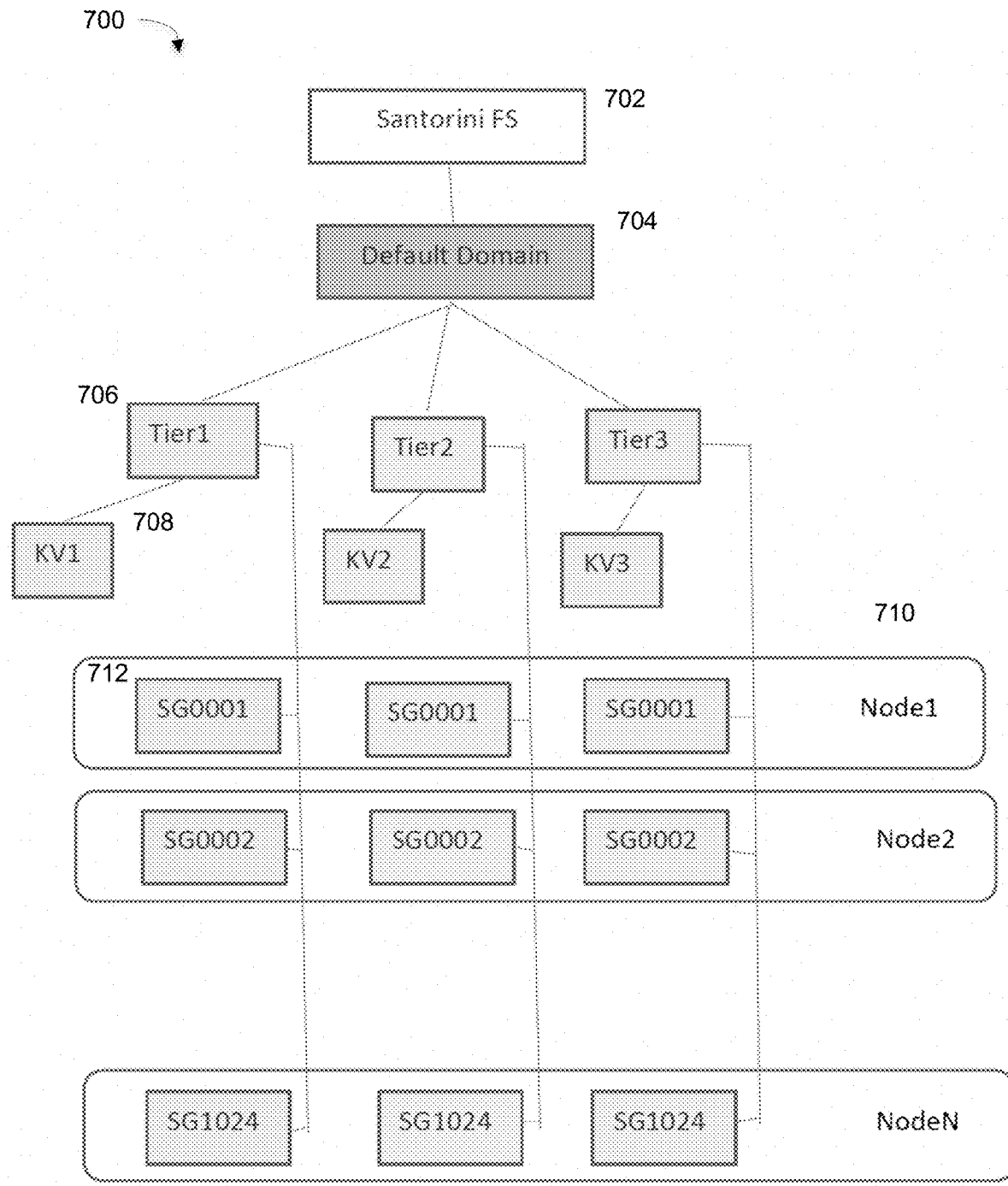
FIG. 7 shows an example distribution of similarity groups of multiple tiers among the deduplication and compression services in a system, under some embodiments.

FIG. 7 shows an example distribution of similarity groups of multiple tiers among the deduplication and compression (Dedup and Compress) services in a single domain, under some embodiments. System 700 includes the Santorini file system 902 and one domain (default domain) 704, though multiple domains are also possible. This default domain has three tiers 706 (Tier1, Tier2, and Tier 3), each with its own respective key-value store, 708. The Dedup and Compress service is shown as nodes 710 (Node1, Node2, Node3) in the system 700. Each node 710 has a set of similarity group IDs (SG000x), as shown, with each node owning the same SG number for all tiers, as mentioned above. Thus, as shown Tier1 comprises SG0001, SG0002, to SG1024 from Node1 to NodeN, Tier2 comprises SG0001, SG0002, to SG1024 from Node1 to NodeN, Tier3 comprises SG0001, SG0002, to SG1024 from Node1 to NodeN, and so on.

Deduplication works by comparing the list of fingerprints in a L1 to the fingerprints already stored for the assigned simgroup (SG) and each tier. This means that there is a separate key value store 708 for each <simgroupID, tierID>, so that deduplication is performed within that <simgroupID, tierID> and does not span tiers for the similarity group.

With this optimization, once the access object service (AoB) generates a similarity group ID (simgroupID), it just needs to pass the data and the tier_ID list to the backend node 120 that owns the similarity group. If there are multiple tiers in the tier_ID list, the deduplication processing across these tiers will be local to the node.

FIG. 7 illustrates the hierarchy between the Santorini FS 702, domains 704, tiers 706, and similarity groups 712. The default domain has three tiers, each with its own key value store. Similarity groups 1-1024 are shown (SG #), and each node has three versions of the similarity group, one per tier so that deduplication happens within a <simgroupID, tierID>. While only one similarity group ID is shown per node, nodes will tend to have upwards of hundreds of similarity groups, depending on the number of nodes in the domain.

In FIG. 7, Tier1, Tier2, Tier3 would be object stores allocated from nodes that were in the default domain, as the only domain. Similarly, KV1, KV2, KV3 will be key value stores allocated from the nodes in the default domain. As files are ingested in this tier, the corresponding file data will be kept in the tier pointed to by the backup_SLA of the file. Similarly, the metadata would be stored in the KV store pointed to by the tier. Any namespace metadata will get stored in the KV store for the default tier in the domain. By configuring the KVs store and the object store from appropriate nodes in the domain, most of the domain configuration can be hidden from the backup/restore path.

In an embodiment, the process 116 of FIG. 1 uses the hierarchy of storage tiers of FIG. 7 to optimize deduplication across multiple storage tiers by partitioning the data space of each tier to a number (N) of similarity groups, and distributing these similarity groups across file system dedup/compress services in a cluster. The distribution is done in such a way that for a given similarity group ID 'x', the same file system service owns the similarity groups of every tier to facilitate efficient local node checks for deduplication.

Figure 8:
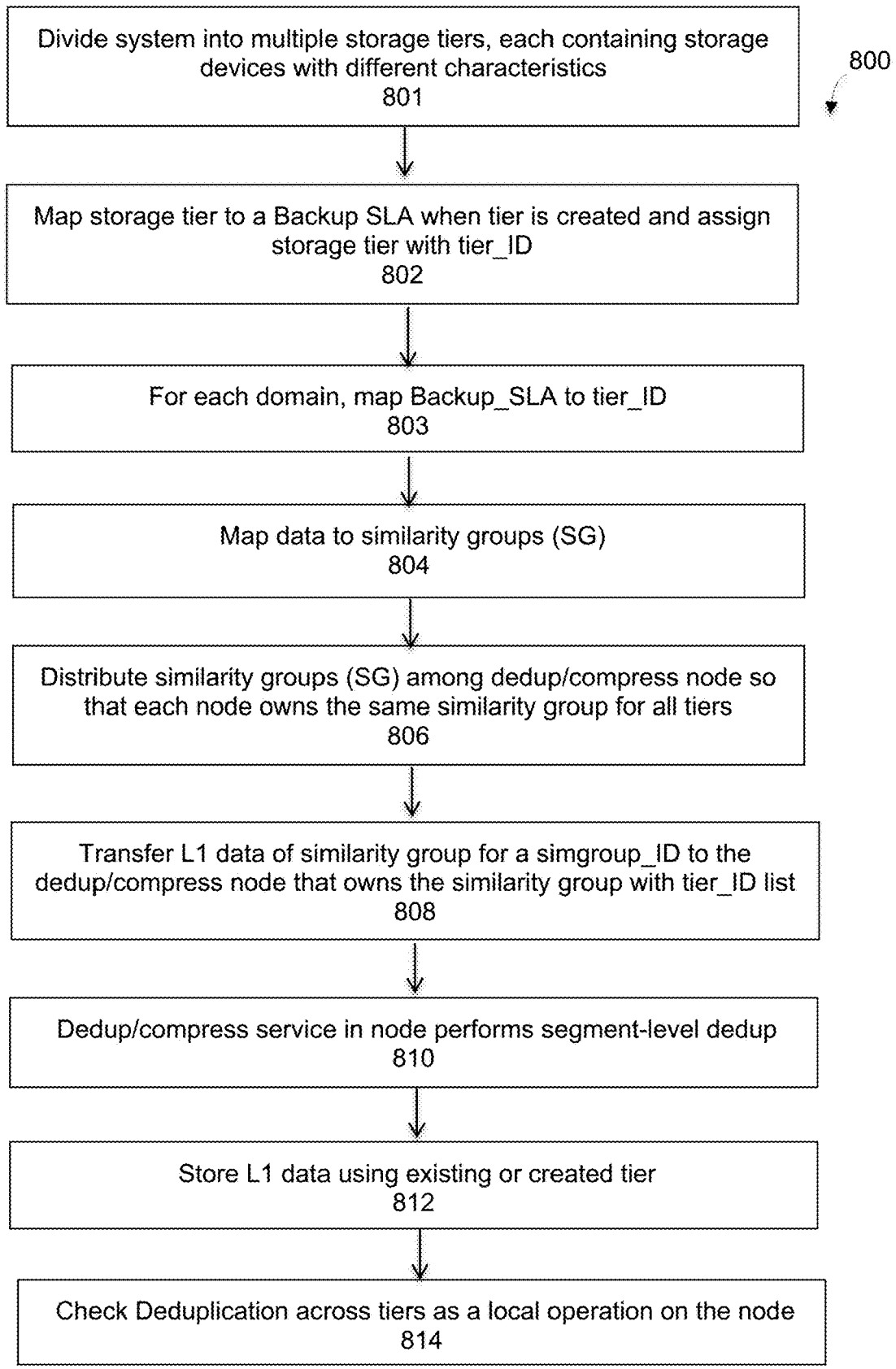
FIG. 8 is a flowchart that illustrates an overall method of deduplicating files across multiple storage tiers, under some embodiments.

FIG. 8 is a flowchart that illustrates an overall method of deduplicating files across multiple storage tiers, under some embodiments. In process 800, a clustered network is first partitioned into a number of separate tiers, with each tier containing storage devices or media (e.g., HDD, SSD, Flash, etc.) having specific performance, availability, and cost characteristics, step 801.

Corresponding to the user SLOs, network providers or vendors provide resources based on SLAs to ensure at least a minimum amount of resources and support to meet these SLOs. In a backup system, each storage tier is associated with a backup SLA, and a storage tier is mapped to a backup SLA when the tier is created in a domain, and each storage tier is assigned an integer value tier_ID, step 802.

The backup SLAs are defined across domains, so for each domain, a backup SLA is mapped to a tier_ID through a mapping table that gives the tier_ID list for the backup SLA for that domain, step 803, the data and metadata of the file is then stored in the associated storage tier. This yields a system-wide mapping of storage tier to tier_ID and a mapping of a backup SLA to tier IDs.

The process then maps a set of L1 segments into similarity groups, where there may be up to 1024 similarity groups per tier, step 804. The similarity groups are then distributed among backend dedup/compress services, step 806, such that the same dedup/compress node owns the same similarity group (e.g., simgroup_ID 'n') for all of the tiers. The L1 worth of data is then transferred to the dedup/compress node that own the similarity group along with the tier_ID list, step 808. The dedup/compress service then performs segment level deduplication, step 810.

The process uses an existing or created tier to store L1 data depending on whether or not entire L1 data exists in any of the tiers (as described above), and store similarity group ID and tier ID accordingly, step 812. The process checks for deduplication across tiers as a local operation through the dedup/compress node that owns the same similarity group for all the tiers, 814.

By this process, the system then maps each storage tier with a backup SLA, and also maps the data (e.g., L1 data) to similarity groups, and these mappings are then used to send data for deduplication processing to the appropriate node for deduplication for all the tiers within a similarity group without requiring any RPCs or similar processing overhead.

It should be noted that each file could have a life cycle where it can move from one tier to another as it ages based on the SLAs associated with that file or the backup set itself. The choice of the initial tier and subsequent placement in another tier with different SLOs is thus possible in the file's life cycle, such as may happen with a Cloud tier. Thus embodiments can be extended to deal with dynamic tiering of files over their life cycles.

Figure 9:
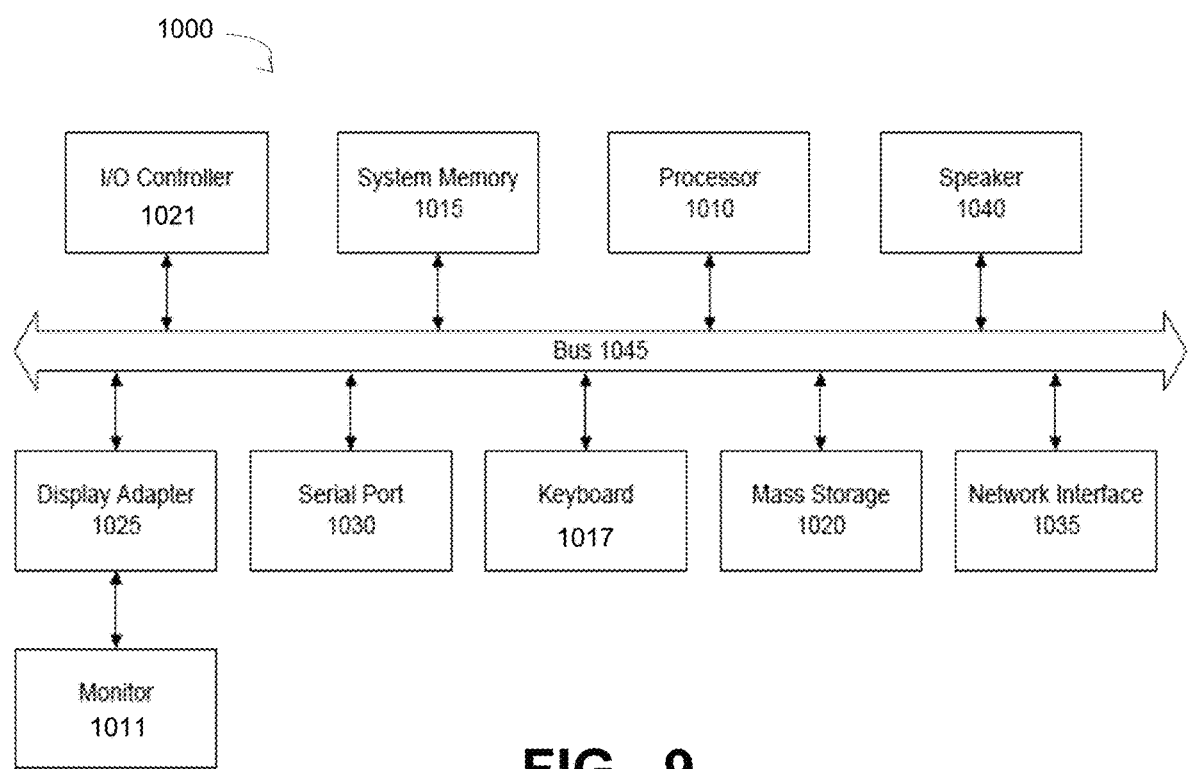
FIG. 9 is a block diagram of a computer system used to execute one or more software components of an event injection process for simulating error conditions in a distributed system, under some embodiments.

FIG. 9 is a block diagram of a computer system used to execute one or more software components of a service scaling process for distributed systems, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be sub-divided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for deduplicating data of data assets in a multi-tier network having a plurality of different storage devices in which a file can have different portions written to different tiers, comprising:
   organizing the storage devices into a plurality of storage tiers based on respective operating characteristics;
   mapping each storage tier to a respective Service Level Agreements (SLA) dictating storage requirements for each of the data assets to a backup program;
   mapping each SLA to one or more tiers of the plurality of tiers based on the storage requirements of a respective SLA to the operating characteristics of each tier;
   partitioning a data space of each tier into a plurality of similarity groups (simgroup), each simgroup having a unique assigned simgroup identifier (ID);
   mapping data of the data assets to the similarity groups based on organization of the data among the tiers;
   distributing the similarity groups across file system services of deduplication nodes in the network so that each file system service owns a same similarity group for all the tiers;
   forming each similarity group by applying a mapping function comprising a hash of fingerprint data for first level data segments (L1) of a Merkle tree organizing the data;
   assigning each file system service to one or more simgroups through a range of simgroup IDs;
   checking, as a local operation performed at each node, data deduplication using a portion of a fingerprint index associated with a respective range of simgroup IDs by checking each similarity group against a mapping table routing a corresponding L1 data segment to a corresponding instance of a deduplication service of the each node; and
   performing deduplication of the data of a similarity group during a backup on a respective deduplication node.

2. The method of claim 1 wherein the storage requirements comprise backup and restore latencies, media availability, and cost, and further wherein the operating characteristics comprise throughput (input/output rate), latency, security, and availability.

3. The method of claim 2 further comprising characterizing the tiers along a performance scale ranging from high performance to low performance for throughput versus cost of storage, and wherein the data assets comprise at least one of files, directories, Mtrees, and namespaces.

4. The method of claim 3 wherein the tiers comprise one or more types of storage media selected from: hard disk drives (HDDs), solid state drives (SSDs), flash memory, and cloud storage, and wherein the performance, availability and cost characteristics are different for each type of storage media.

5. The method of claim 4 wherein the backup software comprises part of a deduplication backup system performing backup and restore operations for nodes of the multi-tier network, and wherein the network comprises a Santorini clustered network.

6. The method of claim 5 wherein the deduplication node executes deduplication and compression services that pack unique data segments, and writes data segments as an object in an object store.

7. The method of claim 6 wherein an SLA attribute is used with the similarity group to send the file to the appropriate tier in the network to meet the SLA.

8. The method of claim 1 wherein the data assets comprise at least one of files, directories, Mtrees, and namespaces, and further wherein the backup software comprises part of a deduplication backup system performing backup and restore operations for nodes of the multi-tier network.

9. The method of claim 1 wherein each similarity group is calculated for an L1 data segment based on SHA1 fingerprints of L0 segments of the Merkle tree, and wherein the deduplication service deduplicates the L0 segments relative to other fingerprints within a same similarity group.

* * * * *